(12) United States Patent
Tian et al.

(10) Patent No.: US 10,680,981 B2
(45) Date of Patent: Jun. 9, 2020

(54) MESSAGE PROCESSING METHOD AND APPARATUS

(71) Applicant: TENCENT TECHNOLOGY (SHENZHEN) COMPANY LIMITED, Shenzhen (CN)

(72) Inventors: Yuan Tian, Shenzhen (CN); Feng Li, Shenzhen (CN); Lin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 253 days.

(21) Appl. No.: 15/701,962

(22) Filed: Sep. 12, 2017

(65) Prior Publication Data
US 2018/0006975 A1 Jan. 4, 2018

Related U.S. Application Data

(63) Continuation of application No. PCT/CN2016/084289, filed on Jun. 1, 2016.

(30) Foreign Application Priority Data

Jul. 15, 2015 (CN) .......................... 2015 1 0417238

(51) Int. Cl.
*H04L 12/58* (2006.01)
*H04M 1/725* (2006.01)

(52) U.S. Cl.
CPC ............ *H04L 51/043* (2013.01); *H04L 51/12* (2013.01); *H04L 51/24* (2013.01); *H04L 51/32* (2013.01); *H04M 1/725* (2013.01)

(58) Field of Classification Search
CPC ....... H04L 51/043; H04L 51/12; H04L 51/32; H04L 51/24; H04M 1/725
See application file for complete search history.

(56) References Cited

U.S. PATENT DOCUMENTS

| 9,473,428 | B1* | 10/2016 | Koum | H04M 3/02 |
| 2006/0248146 | A1 | 11/2006 | Wilk | |
| 2015/0149567 | A1* | 5/2015 | Shmilov | H04W 4/12 |
| | | | | 709/206 |

FOREIGN PATENT DOCUMENTS

| CN | 101282312 A | 10/2008 |
| CN | 102932238 A | 2/2013 |

(Continued)

OTHER PUBLICATIONS

The World Intellectual Property Organization (WIPO) International Search Report for PCT/CN2016/084289 dated Aug. 24, 2016 pp. 1-5.

(Continued)

*Primary Examiner* — Caroline H Jahnige
(74) *Attorney, Agent, or Firm* — Anova Law Group, PLLC

(57) ABSTRACT

The present disclosure provides a message processing method and apparatus. The method includes: obtaining, by a computing terminal associated with the social-network application, a message-reception threshold of a group, the computing terminal including a memory and at least a processor coupled to the memory; obtaining, by the computing terminal, group behavior information of the group, the group behavior information including at least a number of messages received by the group over a preset time duration; and setting, by the computing terminal, the group to a do-not-disturb mode when the number of messages received by the group over the preset time duration exceeds the message-reception threshold, so as to stop sending notification in real time for any new message received by the group.

20 Claims, 5 Drawing Sheets

(56) References Cited

FOREIGN PATENT DOCUMENTS

| | | | |
|---|---|---|---|
| CN | 103051810 | A | 4/2013 |
| CN | 103259825 | A | 8/2013 |
| CN | 104572688 | A | 4/2015 |
| CN | 105120065 | A | 12/2015 |
| EP | 2747014 | A1 | 6/2014 |
| KR | 20150039421 | A | 4/2015 |
| KR | 20150074764 | A | 7/2015 |

OTHER PUBLICATIONS

The State Intellectual Property Office of the People's Republic of China (SIPO) Office Action 1 for 201510417238.9 dated Jun. 7, 2016 pp. 1-7.
Korean Intellectual Property Office (KIPO) Office Action 1 for 10-2017-70322012 dated Nov. 20, 2018 10 Pages (including translation).

* cited by examiner

MESSAGE PROCESSING METHOD AND APPARATUS

RELATED APPLICATIONS

The application is a continuation application of PCT Patent Application No. PCT/CN2016/084289, filed on Jun. 1, 2016, which claims priority to Chinese Patent Application No. 201510417238.9, filed with the Chinese Patent Office on September Jul. 15, 2015, and entitled "MESSAGE PROCESSING METHOD AND APPARATUS", entire content of both of which is incorporated by reference herein.

FIELD OF THE TECHNOLOGY

The present disclosure relates to the field of network technologies and, in particular, to a message processing method and apparatus.

BACKGROUND OF THE DISCLOSURE

With the development of network technologies, social-network applications used for providing information services are developed. A user not only can perform one-to-one message interaction with a friend by using a social-network application, but also can perform, in a group of the social-network application, message interaction with other users in the group. Generally, when a member in a group sends a message, other members in the group can receive the message sent by the member. Therefore, multiple users may discuss a related theme.

However, for a user, although the user may choose whether to join a group, the user may not want to receive messages from some groups due to different attention degrees or use scenarios. To avoid disturbance from the groups, the user may set the groups to a do-not-disturb mode, for example, set the groups to mute groups, to avoid disturbance from the group messages.

In the above message processing manner, do-not-disturb is set only when the user already feels disturbed. That is, the disturbance in fact has occurred. Such a message processing manner can only be subsequently remedial, and cannot prevent initial disturbance.

SUMMARY

According to a first aspect, embodiments of the present disclosure provides a message processing method, including: obtaining, by a computing terminal associated with the social-network application, a message-reception threshold of a group, the computing terminal including a memory and at least a processor coupled to the memory; obtaining, by the computing terminal, group behavior information of the group, the group behavior information including at least a number of messages received by the group over a preset time duration; and setting, by the computing terminal, the group to a do-not-disturb mode when the number of messages received by the group over the preset time duration exceeds the message-reception threshold, so as to stop sending notification in real time for any new message received by the group.

According to another aspect, embodiments of the present disclosure provides a message processing apparatus, including: a memory storing program instructions of a message processing method for a social network application; and at least one processor coupled to the memory and, when executing the program instructions, configured for: obtaining a message-reception threshold of a group; obtaining group behavior information of the group, the group behavior information including at least a number of messages received by the group over a preset time duration; and setting the group to a do-not-disturb mode when the number of messages received by the group over the preset time duration exceeds the message-reception threshold, so as to stop sending notification in real time for any new message received by the group.

According to another aspect, embodiments of the present disclosure provides a non-transitory computer-readable medium containing computer-executable program for, when being executed by a processor, implementing a message processing method for a social-network application. The method includes: obtaining, by a computing terminal associated with the social-network application, a message-reception threshold of a group, the computing terminal including a memory and at least a processor coupled to the memory; obtaining, by the computing terminal, group behavior information of the group, the group behavior information including at least a number of messages received by the group over a preset time duration; and setting, by the computing terminal, the group to a do-not-disturb mode when the number of messages received by the group over the preset time duration exceeds the message-reception threshold, so as to stop sending notification in real time for any new message received by the group.

BRIEF DESCRIPTION OF THE DRAWINGS

To describe the technical solutions in embodiments of the present disclosure more clearly, the accompanying drawings for describing the embodiments are briefly described below. Apparently, the accompanying drawings in the following description show merely some embodiments of the present disclosure, and a person of ordinary skill in the art may derive other accompanying drawings from these accompanying drawings without creative efforts.

DESCRIPTION OF EMBODIMENTS

To make the objectives, technical solutions, and advantages of the present disclosure clearer, embodiments of the present disclosure are described below with reference to the accompanying drawings. Although the present disclosure will be described with reference to the disclosed embodiments, it should be understood that the present disclosure is not limited to the disclosed embodiments. Other embodiments obtained by a person skilled in the art based on the embodiments described in the following descriptions without creative efforts shall fall within the protection scope of the present disclosure. In addition, many specific details are described in specific descriptions of the embodiments of the present disclosure to provide further understanding of the present disclosure. However, a person of ordinary skill in the art should realize that the present disclosure may be implemented without the specific details.

Figure 1:
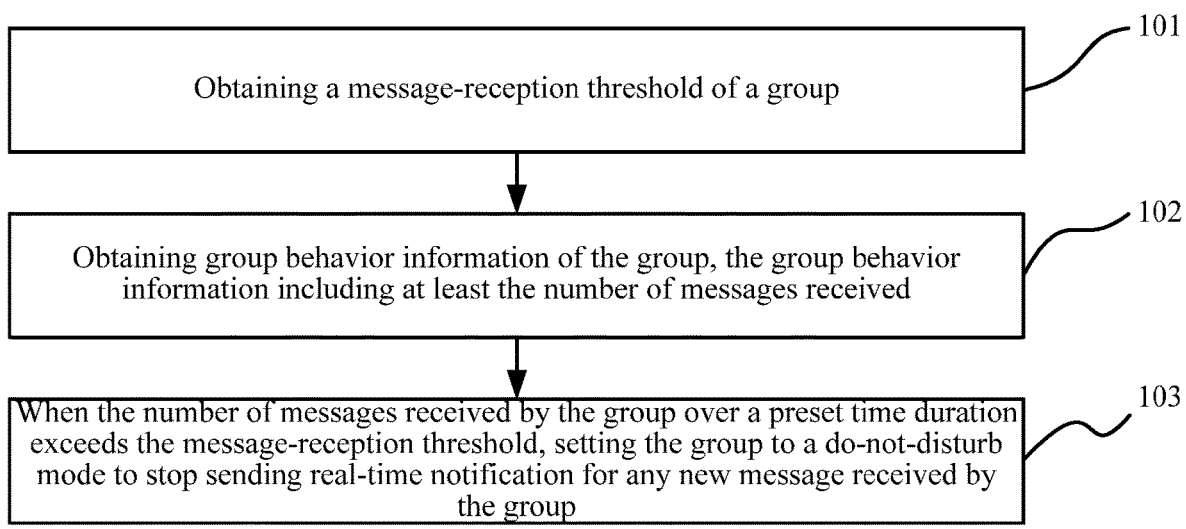
FIG. 1 is a flowchart of a message processing method according to embodiments of the present disclosure.

FIG. 1 is a flowchart of a message processing method for a social-network application according to embodiments of the present disclosure. Referring to FIG. 1, the method includes the followings.

It can be understood that, the method can be implemented by one or more computing terminal associated with the social-network application. The computing terminal includes a memory and at least a processor coupled to the memory and configured to implement the method. The computing terminal may be for example, a user terminal running the social-network application, and/or a server hosting the social-network application.

101: Obtaining a message-reception threshold of a group.

102: Obtaining group behavior information of the group, the group behavior information including at least the number of messages received.

103: When the number of messages received by the group over a preset time duration exceeds the message-reception threshold, setting the group to a do-not-disturb mode to stop sending real-time notification for any new message received by the group.

According to the method provided in the embodiments of the present disclosure, based on group behavior information, a message-reception threshold, and the like, of a group, it can be determined whether a user is currently disturbed, and it can automatically set the group to the do-not-disturb mode when it is determined that disturbance may have occurred, so that a subsequent message in the group is not notified to a user of the group in real time, thereby implementing a message processing method for dynamically triggering the do-not-disturb mode, and effectively preventing message disturbance.

Optionally, the obtaining a message-reception threshold of a group includes: obtaining a message-reception threshold set by a server, and using the obtained message-reception threshold as the message-reception threshold of the group; or obtaining a number of messages received when a user sets the do-not-disturb mode in historical usage processes, and obtaining the message-reception threshold of the group according to statistical analysis of the historical usage processes.

Optionally, for a group in which a number of users is less than a first threshold, the message-reception threshold set by the server is a first message-reception number; for a group in which a number of users is greater than the first threshold and less than a second threshold, the message-reception threshold set by the server is a second message-reception number; for a group in which a number of users is greater than the second threshold, the message-reception threshold set by the server is a third message-reception number; and the first threshold is less than the second threshold, the first message-reception number is greater than the second message-reception number, and the second message-reception number is greater than the third message-reception number.

Optionally, the group behavior information further includes activeness of a user in the group, and the method further comprises: setting the group to the do-not-disturb mode when the activeness of the user in the group is not greater than a preset reference value.

Optionally, when the activeness of the user in the group is greater than the preset reference value, obtaining a mute weight according to the activeness of the user; and adjusting the message-reception threshold of the group according to the mute weight, and setting the do-not-disturb mode based on the adjusted message-reception threshold, where a higher value of activeness corresponds to a higher value of the mute weight and a larger value of the adjusted message-reception threshold.

Optionally, after the setting the group to the do-not-disturb mode, the method further includes: displaying a notification message, wherein the notification message is used for notifying that the do-not-disturb mode of the group has been enabled.

Optionally, the do-not-disturb mode refers to at least one of canceling a sound alert of a new message received by the group, and not displaying the new message received by the group in a notification bar.

Any combination of the foregoing optional technical solutions may be used to form other embodiments of the present disclosure, which is not described one by one herein.

Figure 2:
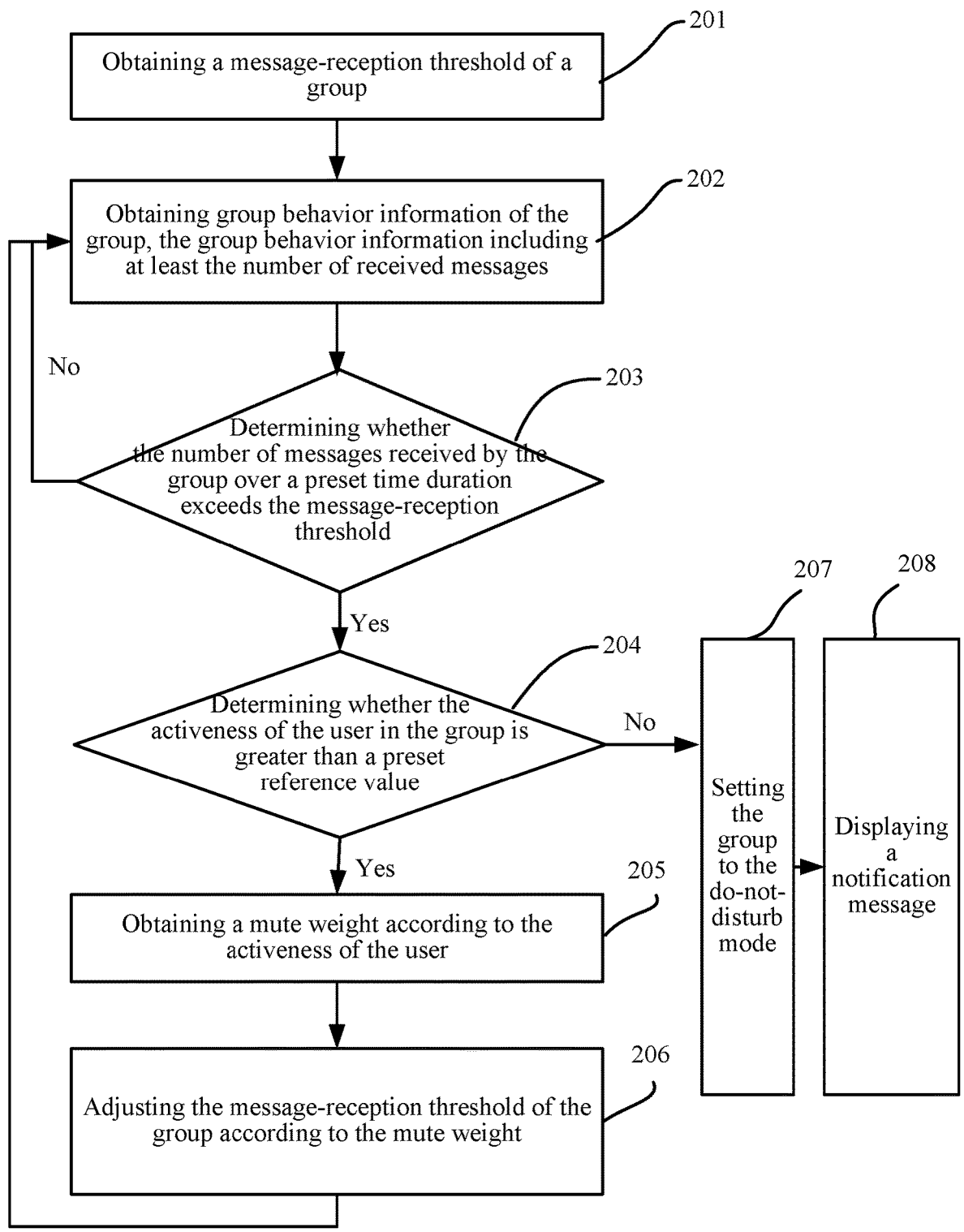
FIG. 2 is a flowchart of another message processing method according to embodiments of the present disclosure.

FIG. 2 is a flowchart of another message processing method according to embodiments of the present disclosure. Referring to FIG. 2, the message processing method specifically includes the followings. The message processing method described in FIG. 2 can be implemented by one or more computing terminal associated with the social-network application. The computing terminal includes a memory and at least a processor coupled to the memory and configured to implement the method. The computing terminal may be for example, a user terminal running the social-network application, and/or a server hosting the social-network application.

201: Obtaining a message-reception threshold of a group.

The message-reception threshold may refer to a maximum number of group messages received by the group in a preset time duration. The preset time duration may be set by a server or may be set by a terminal user, without any specific limitation.

In addition, a terminal may obtain respective message-reception thresholds of a plurality of groups of a user of the terminal when enabling a social-network application on the terminal, or may obtain message-reception thresholds of the groups of the terminal user at any moment during the running process of the social-network application. The timing for obtaining the thresholds is not limited hereby.

In the embodiments of the present disclosure, the process of obtaining the message-reception threshold of the group may be specifically performed in either of the following two manners.

In the first manner, a message-reception threshold set by a server is obtained and used as the message-reception threshold of the group.

A single uniform message-reception threshold may be set for different groups on the server side. Alternatively, different message-reception thresholds may be set for different groups. For a message to be received and processed, if there are relatively a large number of users in a group, the server has relatively high pressure in storage and delivery. If there are relatively fewer users in the group, the pressure is relatively low. Therefore, different message-reception thresholds may be set for groups of different sizes. A smaller message-reception threshold may be set for a larger group.

For example, a group may be classified as a small group, a middle group, and a large group according to its size. The small group may be a group in which the number of users is less than a first threshold. The middle group may be a group in which the number of users is greater than the first threshold and less than a second threshold. The large group may be a group in which the number of users is greater than the second threshold. Correspondingly, for the group in which the number of users is less than the first threshold, the message-reception threshold is set by the server as a first message-reception number; for the group in which the number of users is greater than the first threshold and less than the second threshold, the message-reception threshold is set by the server as a second message-reception number; and for the group in which the number of users is greater than the second threshold, the message-reception threshold is set by the server as a third message-reception number. The first threshold is less than the second threshold, the first message-reception number is greater than the second message-reception number, and the second message-reception number is greater than the third message-reception number.

Certainly, a group may further be classified as a super-large group, a mini group, and the like according to its size, and a message-reception threshold of the group may also satisfy the foregoing principle, without specific limitation.

In the second manner, a user's historical usage data is used to obtain the number of messages already received in a group each time when the user sets the do-not-disturb mode for the group and, based on statistical analysis of the historical usage data, the message-reception threshold of the group is obtained.

To make automatic setting of the do-not-disturb mode better conform to a usage habit of the user, the number of received messages may be recorded each time when the terminal user sets a do-not-disturb mode for any group on the terminal, and the number of received messages may be counted over a preset time duration before the do-not-disturb mode was set. Based on the recorded number of messages received, statistical analysis can be used to obtain the message-reception threshold of any group of the terminal user. The message-reception threshold may be an average number of messages received in the historical usage processes (as a group may be used multiple times in usage history), or a maximum number of messages received in the historical usage processes, or a minimum number of messages received in the historical usage processes, etc. No specific limitation is intended herein.

Certainly, in the statistics collection and analysis process, the message-reception threshold of a particular group may be determined according to a historical usage data of the particular group, or according to historical usage data of multiple groups including the particular group, or the message-reception threshold of the particular group may be a uniform message-reception threshold for all groups determined according to historical use data of multiple groups, without specific limitation.

For example, based on historical usage processes, the number of received messages for group A, group B, and group C are separately counted over a preset time duration before the do-not-disturb mode is set, which are respectively 15, 20, and 25. Thus, the message-reception threshold for all of the groups A, B, and C may be set to (15+20+25)/3=20. If, in multiple historical usage processes, the number of messages received by the group A over the preset time duration is 15, 16, and 17 (e.g., used 3 times) before the group A is set to the do-not-disturb mode, the message-reception threshold for the group A may be set to (15+16+17)/3=16. Other combinations may also be used.

The message-reception threshold obtained in above manners may be more individualized, different groups for different users may have different message-reception thresholds, and same groups for different users may also have different message-reception thresholds.

202: Obtaining group behavior information of the group, the group behavior information including at least the number of received messages.

A terminal may obtain group behavior information of various groups of the terminal user during a running process of a corresponding social-network application, so as to monitor, in real time, whether any group has certain behavior causing disturbance to the user. The group behavior information may only need to be obtained for any group that is not yet set to the do-not-disturb mode. For a group that has already been set to the do-not-disturb mode, the group behavior information may no longer be obtained.

203: Determining whether the number of messages received by the group over a preset time duration exceeds the message-reception threshold. If the number of messages received exceeds the message-reception threshold, the method proceeds to 204 and, if not, the method again continues from 202.

For each group of the terminal user, according to the number of messages received over the preset time duration obtained through monitoring, it can be determined whether the group may have a behavior causing disturbance to the user. If the number of messages received by the group over the preset time duration exceeds the message-reception threshold, the user may feel annoyed and disturbed by message notifications. Therefore, the behavior of the user in the group may be further analyzed to determine whether to automatically set the do-not-disturb mode for the group.

In the embodiments of the present disclosure, for example, the message-reception threshold of the group and the activeness of the user in the group can be combined to set the do-not-disturb mode for the group of the user. In a practical scenario, the do-not-disturb mode may be alternatively set according to the message-reception threshold of the group, or the do-not-disturb mode may be automatically set to avoid disturbing the user.

204: Determining whether the activeness of the user in the group is greater than a preset reference value. If the activeness of the user is greater than the preset reference value, the method proceeds to 205 and, if not, the method proceeds to 207.

The group behavior information of the group may also include the activeness of users in the group. The activeness of a user in a group may be a level of participation of the user in discussions in the group. The activeness may be represented by using the number of messages posted by the user in the group and/or the frequency of posting messages, or, certainly, may be other parameters determined according to the number of messages posted by the user in the group or the frequency of posting messages by the user. A larger number of messages posted by the user in the group or a higher frequency of posting messages corresponds to higher activeness of the user in the group. If the activeness of the user in the group is relatively high, it indicates that the user has a strong sense of participation in the group, and pays relatively high attention. Therefore, even if receiving many messages, the user is not disturbed.

Therefore, whether the user is disturbed may be determined by determining whether the activeness of the user in the group is greater than the preset reference value. When the activeness of the user in the group is greater than the preset reference value, the method proceeds to 205. If the activeness of the user in the group is less than or equal to the preset reference value, it is determined that messages in the group may disturb the user, and the group needs to be automatically set to the do-not-disturb mode.

It should be noted that, to ensure the real-timeliness of the do-not-disturb mode, the activeness of the user in the group in the most recent period of time may be used, and data on messages posted in relatively long time ago is not considered or is still considered in overall but with a decreased proportion.

205: Obtaining a mute weight according to the activeness of the user.

If the user has relatively high activeness in the group, it indicates that the user has a relatively high level of participation in the group, and messages received by the user may not disturb the user. Therefore, the message-reception threshold may be correspondingly adjusted using the mute weight.

A correspondence between the activeness and the mute weight may be preset on the server side. Higher activeness corresponds to a higher mute weight and a larger adjusted message-reception threshold.

For example, when the number of messages received by the group over the preset time duration is B, and the message-reception threshold of the group is A, where B is greater than A, and the activeness of the user in the group is S. If the activeness S is greater than the preset reference value Sset, the mute weight may set according to the activeness S.

206: Adjusting the message-reception threshold of the group according to the mute weight, and the method proceeds to perform 203 based on the adjusted message-reception threshold.

The adjustment may be performed by a process of obtaining a new message-reception threshold based on the mute weight and the message-reception threshold of the group. The process may be implemented using mathematical calculation. For example, when the message-reception threshold of the group is A, and the activeness S is greater than the preset reference value Sset, the mute weight Wi may be obtained according to the activeness, and the new message-reception threshold using the formula A (1+Wi).

After the new message-reception threshold of the group is obtained, the method may proceed to perform 203 according to the new or adjusted message-reception threshold. That is, the group behavior information of the group may again be obtained, and further determination is performed based on the new message-reception threshold and the number of received messages obtained over the preset time duration. When the number of messages that are received by the group over the preset time duration exceeds the new message-reception threshold, the method proceeds to 207.

207: Setting the group to the do-not-disturb mode.

The do-not-disturb mode may be set by changing the configuration of the group to set the group as a muted group or not to receive any messages of the group, or in other manners. No specific limitation is intended herein.

208: Displaying a notification message to prompt the user that the group is set to the do-not-disturb mode.

After the group is set to the do-not-disturb mode, a notification message may be displayed using, for example, a pop-up window or a display prompt bar, to notify the user that the group message notification has been disabled. Messages subsequently received are not notified.

Figure 3:
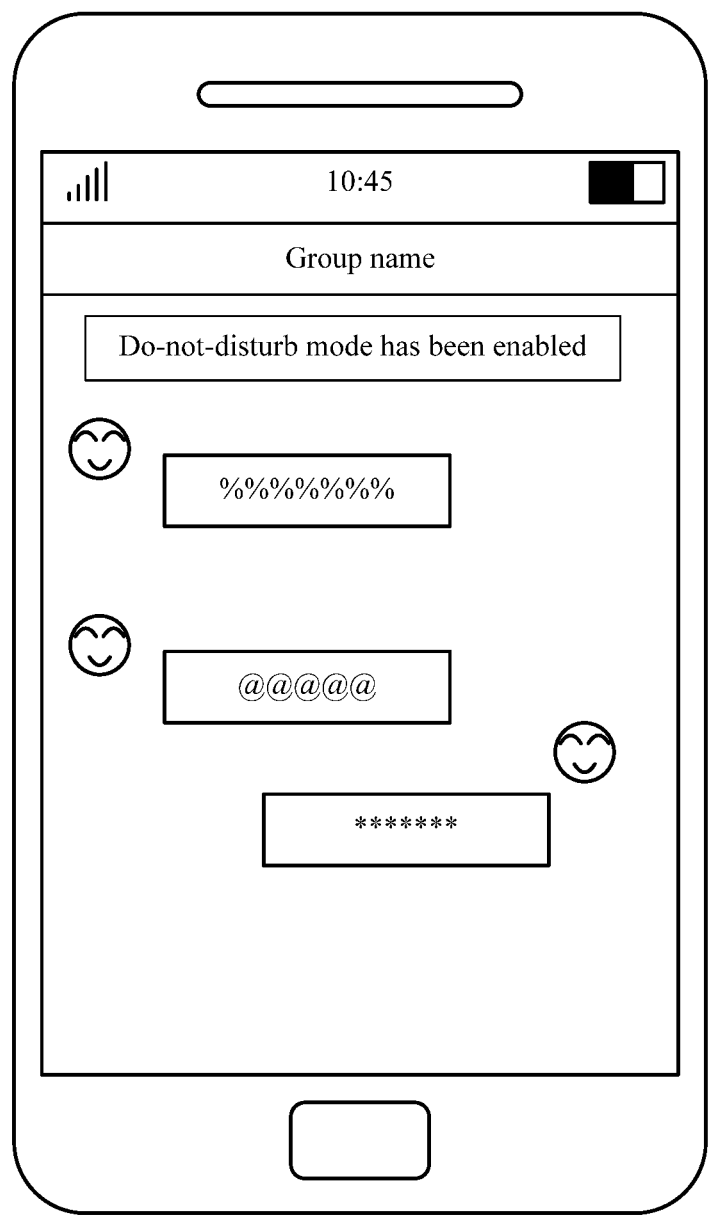
FIG. 3 is a schematic diagram of a display screen for notification message according to embodiments of the present disclosure.

FIG. 3 is a schematic diagram of a display screen displaying a notification message according to embodiments of the present disclosure. As shown in FIG. 3, the notification message "Do-not-disturb mode has been enabled" is display at a display position on the top of a group-session interface. In practical scenarios, the display position of the notification message may also be a position on a session list interface, or may be any position on the group-session interface, without specific limitation.

Further, a setting option for the do-not-disturb mode may be displayed while the notification message is displayed, so that the user may perform rapid setting to cancel the do-not-disturb mode that has been set. Certainly, when displaying the setting option for the do-not-disturb mode, a jump selection option of the setting option may be displayed. When a selection operation on the jump selection option is detected, the display can jump to the setting interface, so that the user cancels the do-not-disturb mode on the setting interface. Optionally, when no operation on the jump selection option or on the notification message is detected over a preset time duration, it may be considered that the user agrees with the setting, and the display of the notification message or the jump selection option is canceled.

It should be noted that such a manner for displaying the notification message may enable the user to determine, by means of counterfactual thinking, whether the user needs to enable the do-not-disturb mode, and may further guide the user to actively perform message notification setting on a group in which the user is interested.

The do-not-disturb mode provided in the foregoing embodiments may refer to canceling a sound alert of a message received by the group; and/or the do-not-disturb mode may refer to not displaying a notification message in a notification bar when a message received by the group. Certainly, the do-not-disturb mode may refer to a combination of the foregoing two manners. That is, a message received by the group is notified neither by using the sound alert nor by displaying notification in notification bar. Therefore, disturbance to the user is minimized.

The do-not-disturb mode may provide different functions for different applications or terminals. The do-not-disturb mode may be not prompting a message received by the group by using a red dot on an application icon. Optionally, after the do-not-disturb mode is set, information such as the number of updated messages may be displayed on a session entry corresponding to the group in the session list interface, so that the user can learn a general session status of the group when the user wants to view the group. Further, for a group that is set to the do-not-disturb mode, the group may stop obtaining any updated messages. Instead, a certain number of recent messages may be obtained according to some group behavior information of the group when the user triggers a viewing operation on the group. Whether to obtain more historical messages is determined based on the operation of the user, thereby reducing traffic consumption of a mobile terminal.

According to the method provided in the embodiments of the present disclosure, based on the group behavior information and the message-reception threshold, etc., it can be determined whether the user is currently disturbed. When it is determined that disturbance may be occurred, the do-not-disturb mode may be automatically set for the group, so that a subsequent message received in the group is not notified to the user in real time, thereby implementing a message processing method for dynamically triggering the do-not-disturb mode, and effectively preventing disturbance from new messages. Further, different message-reception thresholds are determined according to different sizes of the groups, thereby reducing storage and delivery pressure of the server. Moreover, in the determining process, the activeness of the user in the group is determined and the message-reception threshold is dynamically adjusted based on the activeness of the user, so that an automatic setting process better satisfies an actual use habit of the user, and better satisfies user psychology, and the setting is more user friendly.

Figure 4:
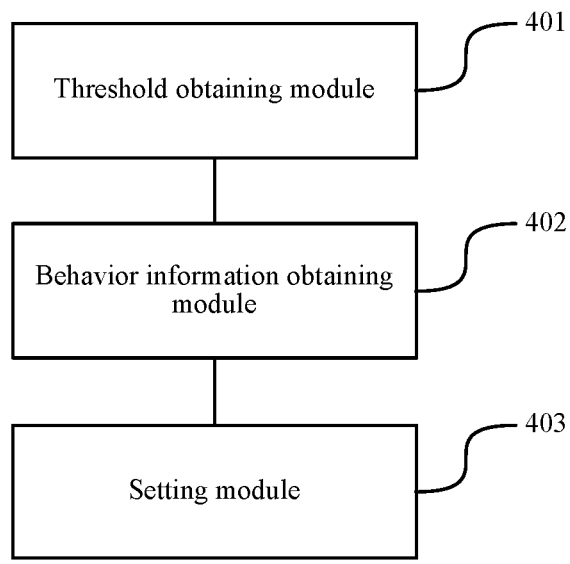
FIG. 4 is a schematic block diagram of a message processing apparatus according to embodiments of the present disclosure.

FIG. 4 is a schematic structural diagram of a message processing apparatus according to embodiments of the present disclosure. Referring to FIG. 4, the apparatus includes a memory storing program instructions of a message processing method for a social network application; and a processor coupled to the memory and, when executing the program instructions, configured for message processing. Further, multiple program modules are stored in the memory and to be executed by the processor. The multiple program modules include: a threshold obtaining module 401, a behavior information obtaining module 402, and a setting module 403. The threshold obtaining module 401 is configured to obtain a message-reception threshold of a group; the behavior information obtaining module 402 is configured to obtain group behavior information of the group, the group behavior information including at least the number of received messages; and the setting module 403 is configured to set the group to a do-not-disturb mode when the number of messages received by the group over preset time duration exceeds the message-reception threshold, so as not to notify the user in real time for any new message received by the group.

Optionally, the threshold obtaining module 401 is configured to: obtain a message-reception threshold set by a server as the message-reception threshold of the group; or obtain the number of messages received when a user sets the do-not-disturb mode in historical usage processes, and obtain the message-reception threshold of the group according to statistical analysis of the historical usage process.

Optionally, for the group in which the number of users is less than the first threshold, the message-reception threshold set by the server is a first message-reception number; for the group in which the number of users is greater than the first threshold and less than the second threshold, the message-reception threshold set by the server is a second message-reception number; and for the group in which the number of users is greater than the second threshold, the message-reception threshold set by the server is a third message-reception number. The first threshold is less than the second threshold, the first message-reception number is less than the second message-reception number, and the second message-reception number is less than the third message-reception number.

Optionally, the group behavior information further includes activeness of the user in the group. The setting module 403 is further configured not to set the group to the do-not-disturb mode when the activeness of the user in the group is greater than a preset reference value.

Optionally, the apparatus further includes a weight obtaining module, which may be configured to obtain a mute weight according to the activeness when the activeness of the user in the group is not greater than the preset reference value.

The setting module 403 is configured to: adjust the message-reception threshold of the group according to the mute weight, and set the do-not-disturb mode based on the adjusted message-reception threshold. Higher activeness corresponds to a higher mute weight and a larger adjusted message-reception threshold.

Optionally, the apparatus further includes a display module, which may be configured to display a notification message, where the notification message is used for notifying that the do-not-disturb mode of the group has been enabled.

Optionally, the do-not-disturb mode provided in the foregoing embodiments may refer to canceling a sound alert of a message received by the group; and/or the do-not-disturb mode may refer to not displaying a notification message in a notification bar when a message received by the group.

It should be noted that the foregoing description of the functional modules is merely used as an example of the message processing apparatus performing message processing. In practical applications, the above functions may be allocated to and completed by different functional modules according to requirements, that is, the internal structure of the apparatus or device is divided into different functional modules to implement all or a part of the functions described above. In addition, the disclosed message processing apparatus may correspond to the disclosed message processing method. For the specific implementation procedure, refer to the method embodiment, and details are not repeated herein.

Figure 6:
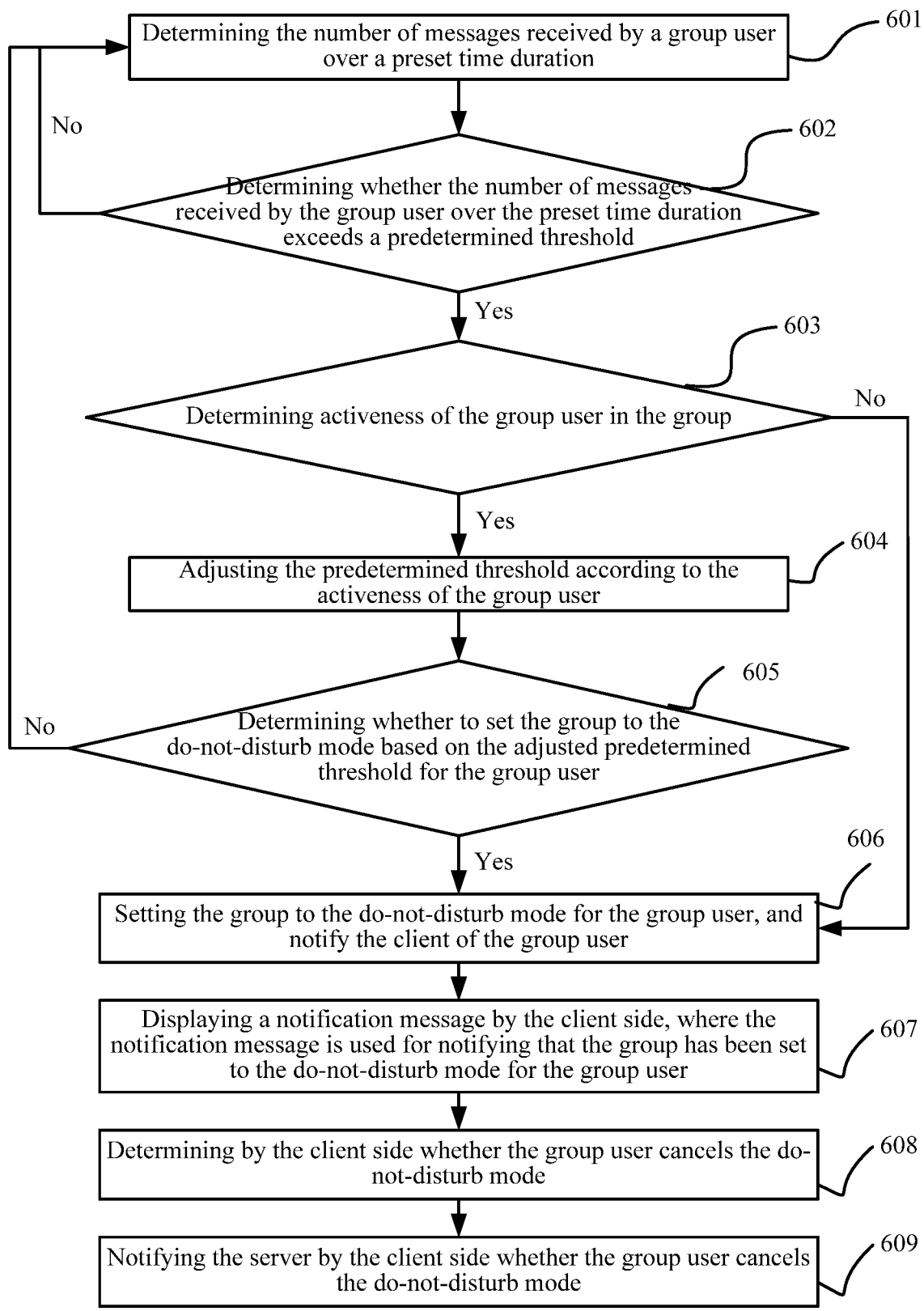
FIG. 6 is a flowchart of another message processing method according to embodiments of the present disclosure.

FIG. 6 is a flowchart of another message processing method (for example, processing a message in a group in a social-network application) according to embodiments of the present disclosure. The method may be implemented in a client-server environment. The client communicates with the server by using a network such as the Internet. The method may be applied to a social-network application that is implemented in the client-server environment and that has at least one group. A member (that is, a group user) of the at least one group of the social-network application may access the server by using the client. The method in the embodiments is described in detail below with reference to FIG. 6. The method shown in FIG. 6 can be implemented by a computing terminal containing a memory and a processor coupled to the memory.

601: Determining the number of messages received by a group user over a preset time duration.

Specifically, the server may determine the number of messages received by the group user over the preset time duration and, in real time, monitor whether the group disturbs the group user. Because messages in the group are transmitted by the server, the server may monitor the time instances when each user in the group receives and sends each message, and the number of messages that are received and sent by the user within the preset time duration.

602: Determining whether the number of messages received by the group user over the preset time duration exceeds a predetermined threshold.

According to the embodiments of the present disclosure, the server may determine whether the number of messages received by the group user over the preset time duration exceeds the predetermined threshold (for convenience of description, the symbol "A" is used to represent the predetermined threshold below). If the number of messages received by the group user exceeds the predetermined threshold, the method proceeds to 603 and, if not, the method continues to 601.

The predetermined threshold may be set by the server in any one of the following manners or a combination thereof.

In the first manner, the server randomly sets the predetermined threshold.

In the second manner, the server sets the predetermined threshold according to the number of users of the group (that is, the total number of all users in the group). A smaller number of users of the group corresponds to a larger predetermined threshold. On the other hand, a larger number of users of the group corresponds a smaller predetermined threshold. Therefore, in an example, the predetermined threshold is inversely proportional to the number of users of the group.

In the third manner, the server determines the predetermined threshold according to a historical behavior of the group user. For example, the server may determine the predetermined threshold for each group user according to the number of messages that are received when each group user sets the do-not-disturb mode in historical usage processes of the group and according to statistical analysis of the historical usage processes. The threshold obtained in such a manner for setting the threshold is more individualized, and one user may have different thresholds in different groups.

603: Determining activeness of the group user in the group.

Specifically, the server may determine the activeness (for convenience of description, the symbol "S" is used to represent the activeness) of the group user in the group according to the number of messages that are sent by the group user to other users in the group or the frequency of sending messages by the group user. For example, it may be simply set the activeness of the group user in the group as directly proportional to the number of messages sent or the frequency of sending messages.

It should be noted that to ensure the real-time nature of the do-not-disturb mode, the activeness of the user in the group in the most recent period of time may be used, and data on messages posted in relatively long time ago is not considered or is still considered in overall but with a decreased proportion.

When the user in the group sends more messages sent or sends messages at higher frequency, it may indicate higher activeness of the user in the group. If the activeness of the user in the group is relatively high, it indicates that the user has a strong sense of participation in the group, and pays relatively high attention. Therefore, even if receiving many messages, the user is less likely to be disturbed. Therefore, a reference value (for convenience of description, the symbol "Sset" is used to represent the reference value) may be set in advance, and the server determines whether the activeness of the user in the group is greater than the reference value.

If the activeness of the user in the group is less than or equal to the reference value, it can be determined that new messages in the group may disturb the user, and the group needs to be automatically set to the do-not-disturb mode (that is, block 606 is performed).

If the activeness of the user in the group is greater than the reference value, it indicates that the user has a strong sense of participation in the group, and pays relatively high attention. In such case, two options may be selectively performed. First, the group is not set to the do-not-disturb mode and, second, the predetermined threshold is increased, that is, block 604 is further performed.

604: Adjusting the predetermined threshold according to the activeness of the group user.

Specifically, the server may adjust the predetermined threshold according to the activeness of the user. For example, when the number of messages that are received by the group over the preset time duration is B, and activeness of the group user in the group is S. If B is greater than the predetermined threshold A, and the activeness S is greater than the reference value Sset, the predetermined threshold A may be adjusted according to S, so that higher activeness S can result in a larger predetermined threshold A.

605: Determining whether to set the group to the do-not-disturb mode based on the adjusted predetermined threshold for the group user.

The server may determine whether to set the group to the do-not-disturb mode based on the adjusted predetermined threshold automatically for the group user. For example, the server may compare the number of messages received by the group user over the preset time duration, as determined in 601, with the adjusted predetermined threshold. If the number of messages received by the group user over the preset time duration exceeds the adjusted predetermined threshold, the group is set to the do-not-disturb mode for the group user. Alternatively, the server may re-determine the number of messages received by the group user over the preset time duration. If the re-determined number exceeds the adjusted predetermined threshold, the group is set to the do-not-disturb mode for the group user. If the server determines that the group is to be set to the do-not-disturb mode for the group user, block 606 is performed.

606: Setting the group to the do-not-disturb mode for the group user, and notify the client of the group user.

The server may set the group to the do-not-disturb mode for the group user, and notifies the group user on the terminal client. For example, the server may set the group to a mute group for the group user. No specific limitation is intended herein.

607: Displaying a notification message by the client side, where the notification message is used for notifying that the group has been set to the do-not-disturb mode for the group user.

After the group is set to the do-not-disturb mode, a notification message may be displayed using, for example, a pop-up window or a display prompt bar, to notify the group user that the group has been set to the do-not-disturb mode.

Further, while the notification message is displayed, a setting option for the do-not-disturb mode may be displayed while the notification message is displayed, so that the user may perform rapid setting to cancel the do-not-disturb mode that has been set.

608: Determining by the client side whether the group user cancels the do-not-disturb mode.

If the group user does not want to set the group to the do-not-disturb mode, the user may operate the setting option to cancel the set do-not-disturb mode. In certain embodiments, if the group user has not operated the setting option within a period of time, it is considered that the user agrees to set the group to the do-not-disturb mode.

In this way, the displaying of the notification message may enable the user to think whether the user really needs to enable the do-not-disturb mode. Certainly, a person skilled in the art may understand that it is not necessary to display the notification message. To reduce operations of the user and burdens caused to the user, it may be optional to display the notification message and other related steps.

609: Notifying the server by the client side whether the group user cancels the do-not-disturb mode.

The client notifies the server whether the group user cancels the do-not-disturb mode. The server disables the do-not-disturb mode according to the notification from the client if the user cancels the do-not-disturb mode. The server keeps the do-not-disturb mode on if the user does not cancel the do-not-disturb mode. In addition, the server stores, according to the notification from the client, a status of the do-not-disturb mode, that is, whether the do-not-disturb mode is in a disabled state or an enabled state. According to the embodiments of the present disclosure, optionally, the client notifies the server only when the group user cancels the do-not-disturb mode. The server disables the do-not-disturb mode according to the notification of the client.

In the above description, the server notifies the client of the group user after setting the group to the do-not-disturb mode for the group user (606); the client displays the notification message (607); the client then determines whether the do-not-disturb mode is canceled (608), and notifies the server (609). Optionally, in 606, the server does not set the group to the do-not-disturb mode. Instead, the server notifies the client of the group user that the group is going to be set to the do-not-disturb mode. In this way, in 607, the client displays the notification message to notify that the group is going to be set to the do-not-disturb mode. Then, in 608, the client receives a feedback of the user. If the user agrees to set the group to the do-not-disturb mode, in 609, the client notifies the server. Subsequently, the server sets the group to the do-not-disturb mode for the group user.

It should be noted that the sequence of the foregoing steps is not limited in the present disclosure in any manner. In addition, one or more of the foregoing steps may be omitted, and implementation of the embodiments of the present disclosure is not affected. For example, block 602 may be omitted, or the server may set the group to the do-not-disturb mode for the user, but does not notify the client. It should be further noted that a person skilled in the art may understand that one or more steps that are described above and that are performed by the server may be performed by the client, and similarly, one or more steps that are described above and that are performed by the client may be performed by the server.

Although the embodiments of the present disclosure are described by using the client-server environment, a person skilled in the art may understand that the method in the embodiments may be implemented in another environment (for example, an equal environment serving as a non-restrictive example).

The do-not-disturb mode provided in the foregoing embodiments may refer to canceling a sound alert of a message received by the group; and/or the do-not-disturb mode may refer to not displaying a message received by the group in a notification bar. Certainly, the do-not-disturb mode may refer to a combination of the foregoing two manners. That is, a message received by the group is notified neither by using the sound alert nor by displaying in notification bar. Therefore, disturbance to the user is minimized.

According to the embodiments of the present disclosure, based on the group behavior information and the message-reception threshold, etc., it can be determined whether the user is currently disturbed. When it is determined that disturbance may be occurred, the do-not-disturb mode may be automatically set for the group, so that a subsequent message received in the group is not notified to the user in real time, thereby implementing a message processing method for dynamically triggering the do-not-disturb mode, and effectively preventing disturbance from new messages. Further, different message-reception thresholds are determined according to different sizes of the groups, thereby reducing storage and delivery pressure of the server. Moreover, in the determining process, the activeness of the user in the group is determined and the message-reception threshold is dynamically adjusted based on the activeness of the user, so that an automatic setting process better satisfies an actual use habit of the user, and better satisfies user psychology, and the setting is more user friendly.

Embodiments of the present disclosure further provide a message processing apparatus. The apparatus includes a memory and a processor. The memory stores program instructions. The message processing apparatus are configured, when the instructions are executed by the processor, to execute the method according to any one of the foregoing embodiments.

Embodiments of the present disclosure further provide a computer-readable storage medium, which mainly stores program instructions. When the instructions are executed by the processor, the method according to any one of the foregoing embodiments can be performed.

Figure 5:
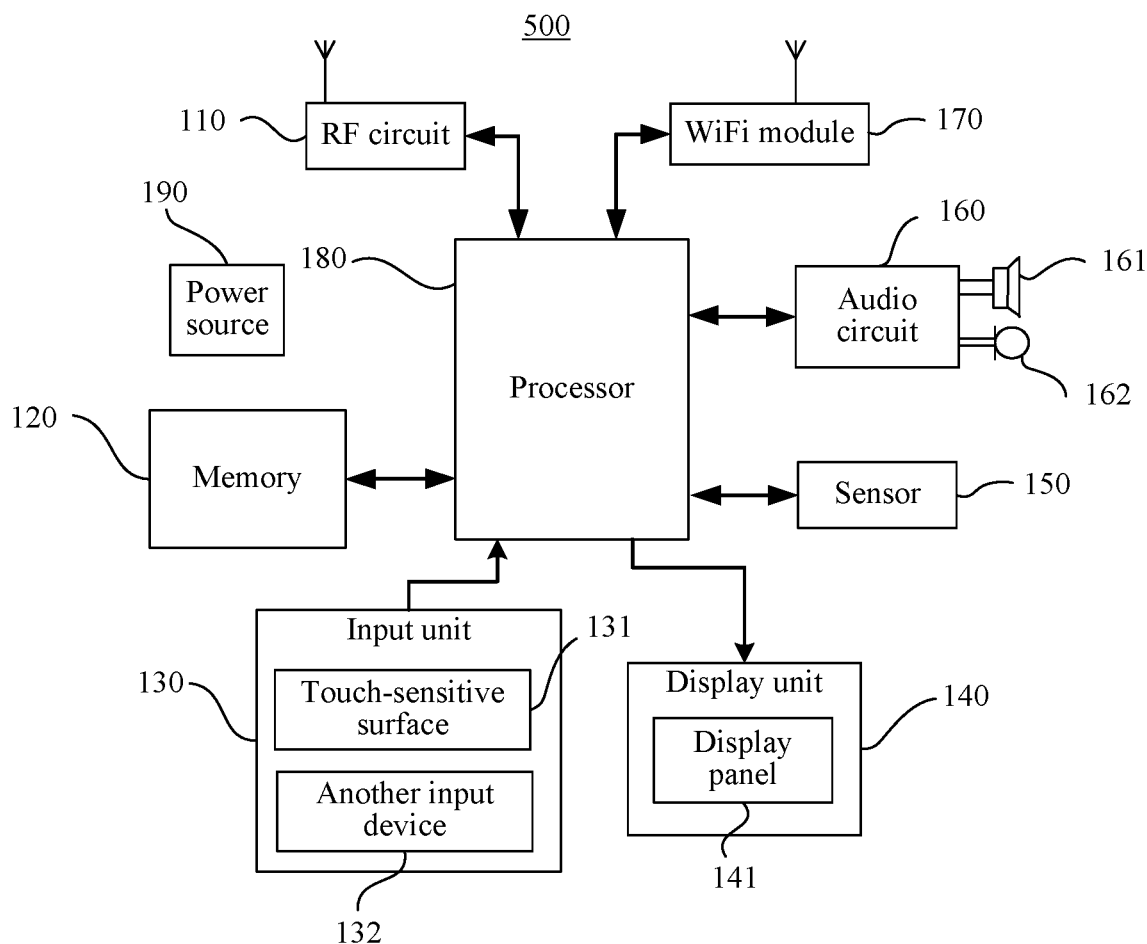
FIG. 5 is a schematic structural diagram of a terminal according to embodiments of the present disclosure.

Embodiments of the present disclosure further provide a terminal/server. The terminal may be configured to execute the message processing method provided in the foregoing embodiments. Referring to FIG. 5, the terminal 500 includes a radio frequency (RF) circuit 110, a memory 120 including one or more computer-readable storage media, an input unit 130, a display unit 140, a sensor 150, an audio circuit 160, a Wireless Fidelity (WiFi) module 170, a processor 180 including one or more processing cores, and a power source 190, etc. A person skilled in the art may understand that a terminal structure shown in FIG. 5 constitutes no limitation to the terminal/server, and the terminal/server may include more or fewer components than those shown in the figure, or some components may be combined, or a different component deployment may be used.

The RF circuit 110 may be configured to: receive and send signals during an information receiving and sending process or a call process, particularly, after receiving downlink information of a base station, deliver the downlink information of the base station to one or more processors 180 for processing, and in addition, send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may communicate with a network and another device by means of wireless communication. The wireless communication may use any communications standard or protocol, including but not limited to: Global System for Mobile communications (GSM), General Packet Radio Service (GPRS), Code Division Multiple Access (CDMA), Wideband Code Division Multiple Access (WCDMA), Long Term Evolution (LTE), emails, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound play function and an image display function), and the like. The program storage area may store data (such as audio frequency data and an address book) created according to the use of the terminal 500, and the like. In addition, the memory 120 may include a high-speed random access memory, and may also include a non-volatile memory such as at least one disk storage component, a flash memory component, or another volatile solid-state storage component. Correspondingly, the memory 120 may further include a memory controller, to provide access of the processor 180 and the input unit 130 to the memory 120.

The input unit 130 may be configured to: receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which is also referred to as a touchscreen or a touch panel, may collect a touch operation of a user on or near the touch-sensitive surface (such as an operation that is performed by a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, and then sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, or a joystick.

The display unit 140 may be configured to display information entered by the user or information provided for the user, and various graphical user interfaces of the terminal 500. These graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, to determine the type of the touch event. Then, the processor 180 provides a corresponding visual output on the display panel 141 according to the type of the touch event. Although in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The terminal 500 may further include at least one sensor 150, for example, an optical sensor, a motion sensor, and other sensors. Specifically, the optical sensor may include an ambient light sensor and a proximity sensor, where the ambient light sensor may adjust brightness of the display panel 141 according to luminance of the ambient light. The proximity sensor may switch off the display panel 141 and/or backlight when the terminal 500 is moved to the ear. As one type of motion sensor, a gravity acceleration sensor may detect magnitude of accelerations in various directions (generally on three axes), may detect magnitude and a direction of the gravity when static, and may be configured to identify an application of a mobile phone gesture (such as switchover between horizontal and vertical screens, a related game, and gesture calibration of a magnetometer), a function related to vibration recognition (such as a pedometer and a knock), and the like. Other sensors, such as a gyroscope, a barometer, a hygrometer, a thermometer, and an infrared sensor, which may be configured in the terminal 500 are not further described herein.

The audio circuit 160, a speaker 161, and a microphone 162 may provide an audio interface between the user and the terminal 500. The audio circuit 160 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 160 receives the electrical signal and converts the electrical signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 500.

WiFi is a short distance wireless transmission technology. The terminal 500 may help, by using the WiFi module 170, the user to receive and send e-mails, browse a web page, access streaming media, and so on. WiFi provides wireless broadband Internet access for the user. Although FIG. 5 shows the WiFi module 170, it may be understood that the WiFi module 170 is not a necessary component of the terminal 500. When required, the WiFi module may be omitted as long as the essence of the present disclosure is not changed.

The processor 180 is a control center of the terminal 500, and is connected to various parts of the mobile phone by using various interfaces and lines. By running or executing the software program and/or module stored in the memory 120, and invoking data stored in the memory 120, the processor 180 executes various functions of the terminal 500 and processes data, thereby performing overall monitoring on the mobile phone. Optionally, the processor 180 may include one or more processing cores. Preferably, the processor 180 may integrate an application processor and a modem processor. The application processor mainly processes an operating system, a user interface, an application program, and the like. The modem processor mainly processes wireless communication. It may be understood that the foregoing modem processor may not be integrated into the processor 180.

The terminal 500 further includes the power source 190 (for example, a battery) that supplies power to various components. Preferably, the power source may be logically connected to the processor 180 by using a power management system, to implement functions such as charging, discharging, and power consumption management by using the power management system. The power source 190 may further include one or more of a direct current or alternate current power source, a re-charging system, a power source fault detection circuit, a power source converter or an inverter, a power source state indicator, or any other components.

Although not shown in the figure, the terminal 500 may further include a camera, a Bluetooth module, and the like, and details are not described herein. Specifically, in the embodiments, the display unit of the terminal is a touchscreen display, and the terminal further includes a memory and one or more programs. The one or more programs are stored in the memory and configured to be executed by one or more processors. The one or more programs include instructions used for executing the operations on a terminal side in the foregoing embodiment.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely examples of the embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A message processing method for a social-network application, comprising:
   obtaining, by a computing terminal associated with the social-network application, a message-reception threshold of a group, the computing terminal including a memory and at least a processor coupled to the memory;
   obtaining, by the computing terminal, group behavior information of the group, the group behavior information including at least a number of messages received by the group over a preset time duration and activeness of a user in the group;
   if the activeness of the user in the group is not greater than a preset reference value, setting, by the computing terminal, the group to a do-not-disturb mode according to whether the number of messages received by the group over the preset time duration exceeds the message-reception threshold; and
   if the activeness of the user in the group is greater than the preset reference value, setting, by the computing terminal, the group to the do-not-disturb mode according to whether the number of messages received by the group over the preset time duration exceeds an adjusted message-reception threshold, the adjusted message-reception threshold being obtained according to a mute weight based on the activeness of the user, so as to stop sending notification in real time for any new message received by the group, wherein a higher value of activeness corresponds to a higher value of the mute weight and a larger value of the adjusted message-reception threshold.

2. The message processing method according to claim 1, wherein the obtaining the message-reception threshold of the group comprises:
   obtaining the message-reception threshold set by a server, and using the obtained message-reception threshold as the message-reception threshold of the group; or
   obtaining the number of messages received when the user sets the do-not-disturb mode in historical usage processes, and obtaining the message-reception threshold of the group according to statistical analysis of the historical usage processes.

3. The message processing method according to claim 1, wherein the group includes a number of users:
   if the number of users is less than a first threshold, the message-reception threshold is a first message-reception number;
   if the number of users is greater than the first threshold and less than a second threshold, the message-reception threshold is a second message-reception number;
   if the number of users is greater than the second threshold, the message-reception threshold is a third message-reception number; and
   the first threshold is less than the second threshold, the first message-reception number is greater than the second message-reception number, and the second message-reception number is greater than the third message-reception number.

4. The message processing method according to claim 1, after setting the group to the do-not-disturb mode, the method further comprising:
   displaying a notification message to notify that the do-not-disturb mode of the group has been enabled.

5. The message processing method according to claim 1, wherein the do-not-disturb mode refers to at least one of:
   canceling a sound alert of a new message received by the group; and
   not displaying the new message received by the group.

6. The message processing method according to claim 1, wherein obtaining the message-reception threshold of the group comprises updating the message-reception threshold according to a size of the group.

7. The message processing method according to claim 1, further comprising:
   displaying, by the computing terminal, a setting option to enable cancelling the do-not-disturb mode as needed.

8. A message processing apparatus, comprising: a memory storing program instructions of a message processing method for a social network application; and a processor coupled to the memory and, when executing the program instructions, configured for:
   obtaining a message-reception threshold of a group;
   obtaining group behavior information of the group, the group behavior information including at least a number of messages received by the group over a preset time duration and activeness of a user in the group;
   if the activeness of the user in the group is not greater than a preset reference value, setting the group to a do-not-disturb mode according to whether the number of messages received by the group over the preset time duration exceeds the message-reception threshold; and
   if the activeness of the user in the group is greater than the preset reference value, setting the group to the do-not-disturb mode according to whether the number of messages received by the group over the preset time duration exceeds an adjusted message-reception threshold, the adjusted message-reception threshold being obtained according to a mute weight based on the activeness of the user, so as to stop sending notification in real time for any new message received by the group, wherein a higher value of activeness corresponds to a higher value of the mute weight and a larger value of the adjusted message-reception threshold.

9. The message processing apparatus according to claim 8, wherein the obtaining the message-reception threshold of the group comprises:
   obtaining the message-reception threshold set by a server, and using the obtained message-reception threshold as the message-reception threshold of the group; or
   obtaining the number of messages received when the user sets the do-not-disturb mode in historical usage processes, and obtaining the message-reception threshold of the group according to statistical analysis of the historical usage processes.

10. The message processing apparatus according to claim 8, wherein the group includes a number of users:
    if the number of users is less than a first threshold, the message-reception threshold is a first message-reception number;
    if the number of users is greater than the first threshold and less than a second threshold, the message-reception threshold is a second message-reception number;

if the number of users is greater than the second threshold, the message-reception threshold is a third message-reception number; and the first threshold is less than the second threshold, the first message-reception number is greater than the second message-reception number, and the second message-reception number is greater than the third message-reception number.

11. The message processing apparatus according to claim 8, wherein the processor is further configured for:
displaying a notification message to notify that the do-not-disturb mode of the group has been enabled.

12. The message processing apparatus according to claim 8, wherein the do-not-disturb mode refers to at least one of:
canceling a sound alert of a new message received by the group; and
not displaying the new message received by the group.

13. The message processing apparatus according to claim 8, wherein obtaining the message-reception threshold of the group comprises updating the message-reception threshold according to a size of the group.

14. The message processing apparatus according to claim 8, wherein the processor is further configured to:
displaying a setting option to enable cancelling the do-not-disturb mode as needed.

15. A non-transitory computer-readable storage medium containing computer-executable program for, when being executed by a processor, implementing a message processing method for a social-network application, the method comprising:
obtaining, by a computing terminal associated with the social-network application, a message-reception threshold of a group, the computing terminal including a memory and at least a processor coupled to the memory;
obtaining, by the computing terminal, group behavior information of the group, the group behavior information including at least a number of messages received by the group over a preset time duration and activeness of a user in the group;
if the activeness of the user in the group is not greater than a preset reference value, setting, by the computing terminal, the group to a do-not-disturb mode according to whether the number of messages received by the group over the preset time duration exceeds the message-reception threshold; and
if the activeness of the user in the group is greater than the preset reference value, setting, by the computing terminal, the group to the do-not-disturb mode according to whether the number of messages received by the group over the preset time duration exceeds an adjusted message-reception threshold, the adjusted message-reception threshold being obtained according to a mute weight based on the activeness of the user, so as to stop sending notification in real time for any new message received by the group, wherein a higher value of activeness corresponds to a higher value of the mute weight and a larger value of the adjusted message-reception threshold.

16. The non-transitory computer-readable storage medium according to claim 15, wherein the obtaining the message-reception threshold of the group comprises:
obtaining the message-reception threshold set by a server, and using the obtained message-reception threshold as the message-reception threshold of the group; or
obtaining the number of messages received when the user sets the do-not-disturb mode in historical usage processes, and obtaining the message-reception threshold of the group according to statistical analysis of the historical usage processes.

17. The non-transitory computer-readable storage medium according to claim 15, wherein the group includes a number of users:
if the number of users is less than a first threshold, the message-reception threshold is a first message-reception number;
if the number of users is greater than the first threshold and less than a second threshold, the message-reception threshold is a second message-reception number;
if the number of users is greater than the second threshold, the message-reception threshold is a third message-reception number; and
the first threshold is less than the second threshold, the first message-reception number is greater than the second message-reception number, and the second message-reception number is greater than the third message-reception number.

18. The non-transitory computer-readable storage medium according to claim 15, wherein the method further comprises:
after setting the group to the do-not-disturb mode, displaying a notification message to notify that the do-not-disturb mode of the group has been enabled.

19. The non-transitory computer-readable storage medium according to claim 15, wherein obtaining the message-reception threshold of the group comprises updating the message-reception threshold according to a size of the group.

20. The non-transitory computer-readable storage medium according to claim 15, wherein the method further comprises:
displaying, by the computing terminal, a setting option to enable cancelling the do-not-disturb mode as needed.

* * * * *